W. W. ROSENFIELD.
MOTOR.
APPLICATION FILED JULY 24, 1907.

985,454.

Patented Feb. 28, 1911.

4 SHEETS—SHEET 1.

Witnesses:
M. C. Massie.
M. Taylor.

Inventor:
William W. Rosenfield
by his Attys:
Philip P. Sawyer, Rice & Kennedy

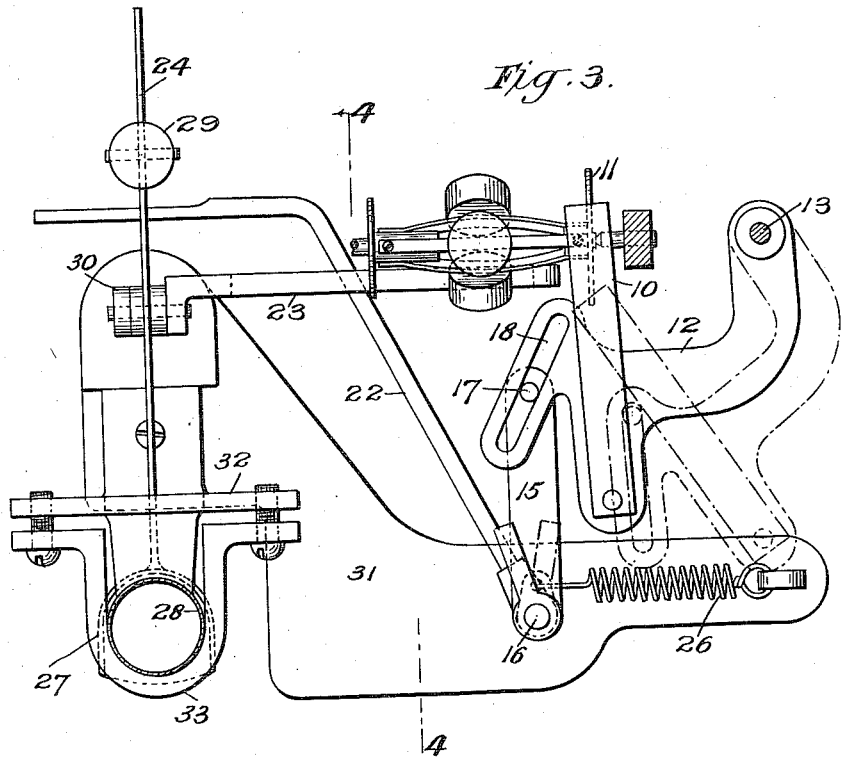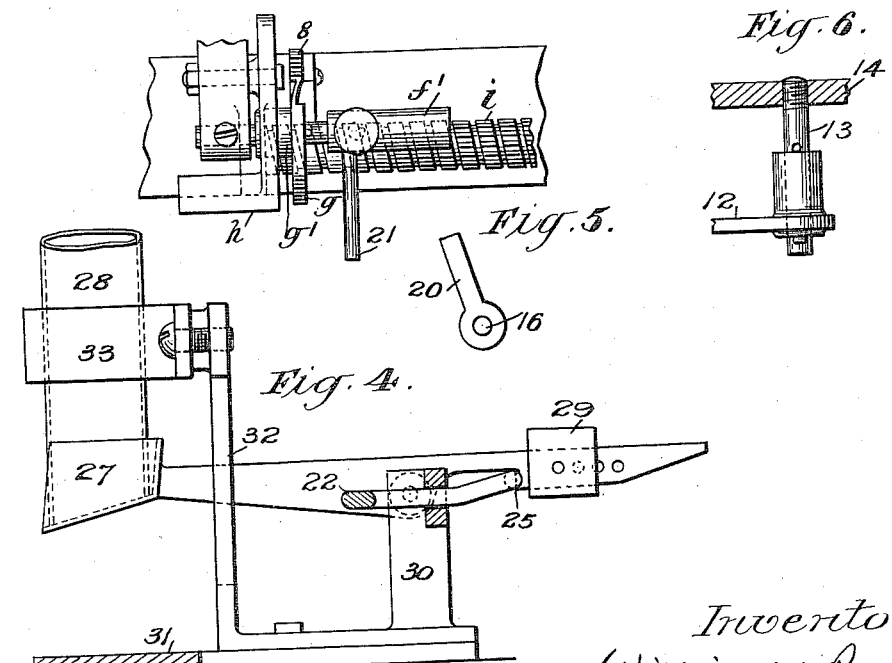

W. W. ROSENFIELD.
MOTOR.
APPLICATION FILED JULY 24, 1907.

985,454.

Patented Feb. 28, 1911.
4 SHEETS—SHEET 4.

Witnesses:
M. C. Massie.
M. Taylor.

Inventor:
William W. Rosenfield
by his Attys:
Philipp, Sawyer, Rice & Kennedy

UNITED STATES PATENT OFFICE.

WILLIAM W. ROSENFIELD, OF NEW YORK, N. Y.

MOTOR.

985,454.  Specification of Letters Patent.  Patented Feb. 28, 1911.

Original application filed February 1, 1905, Serial No. 243,612. Divided and this application filed July 24, 1907. Serial No. 385,388.

*To all whom it may concern:*

Be it known that I, WILLIAM W. ROSENFIELD, a citizen of the United States, residing at New York city, county of New York, and State of New York, have invented certain new and useful Improvements in Motors, fully described and represented in the following specification and the accompanying drawings, forming a part of the same.

This invention relates to motors specially intended for driving light machines or machine elements, such as phonographs or talking machines.

The invention relates more especially to motors of that class in which an electric or other suitable motor is employed as a primary source of power and operates to automatically rewind or store power in a spring or other suitable motor which furnishes the immediate driving power for the machine or machine element and which requires frequent application of energy thereto.

The invention aims to provide means for automatically controlling the operation of both the primary motor and the driving motor so that the primary motor will be caused to restore the tension of the driving motor for each predetermined operation thereof.

A full understanding of the invention can best be given by a detailed description of a preferred construction embodying the various features thereof, and such a description will now be given in connection with the accompanying drawings showing the invention as applied to an automatically operated phonograph such as shown and described in an application filed by me August 5, 1904, Serial No. 219,599.

The present application constitutes a division of my application Serial No. 243,612, filed February 1, 1905.

Figure 1:
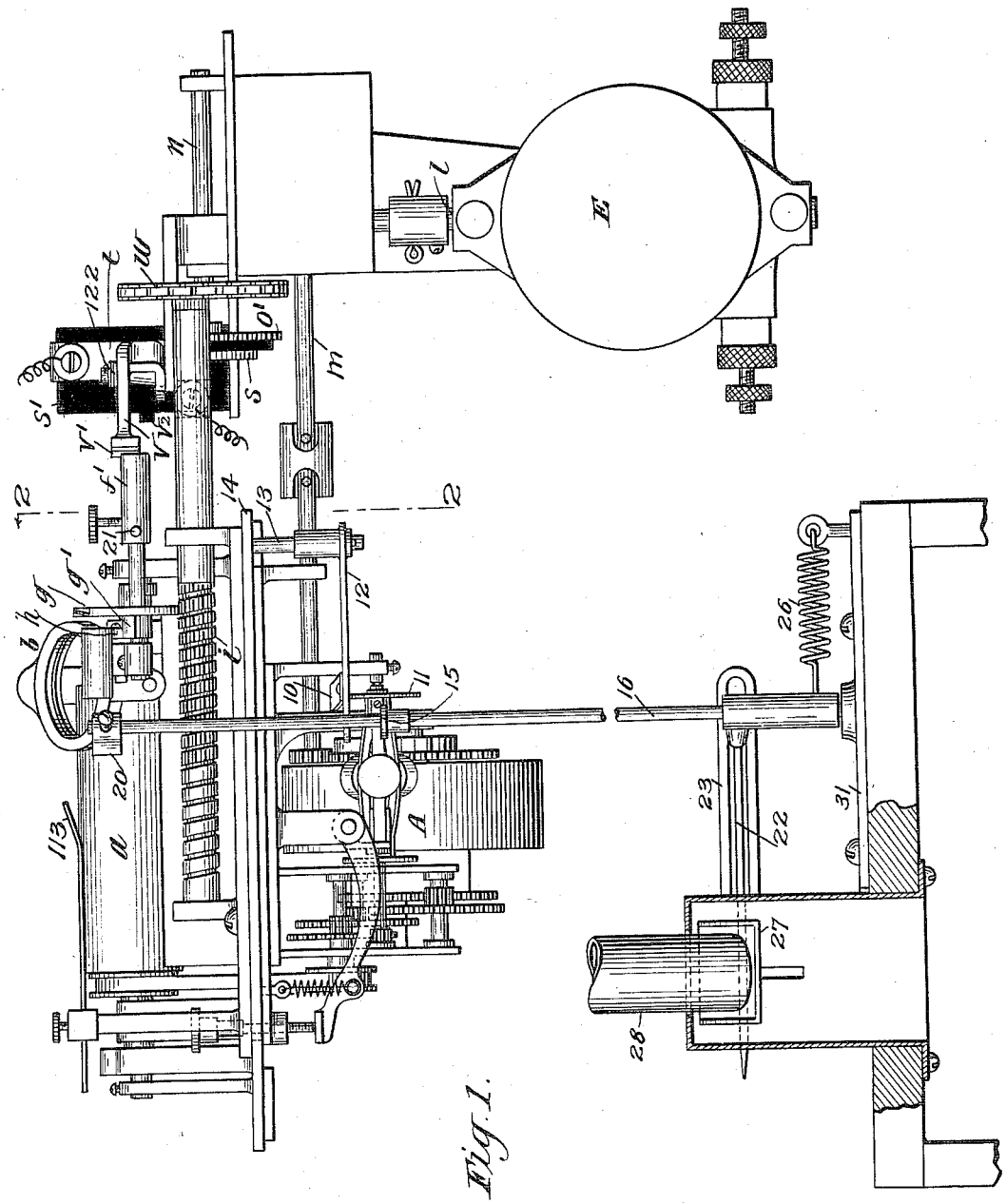
Figure 2:
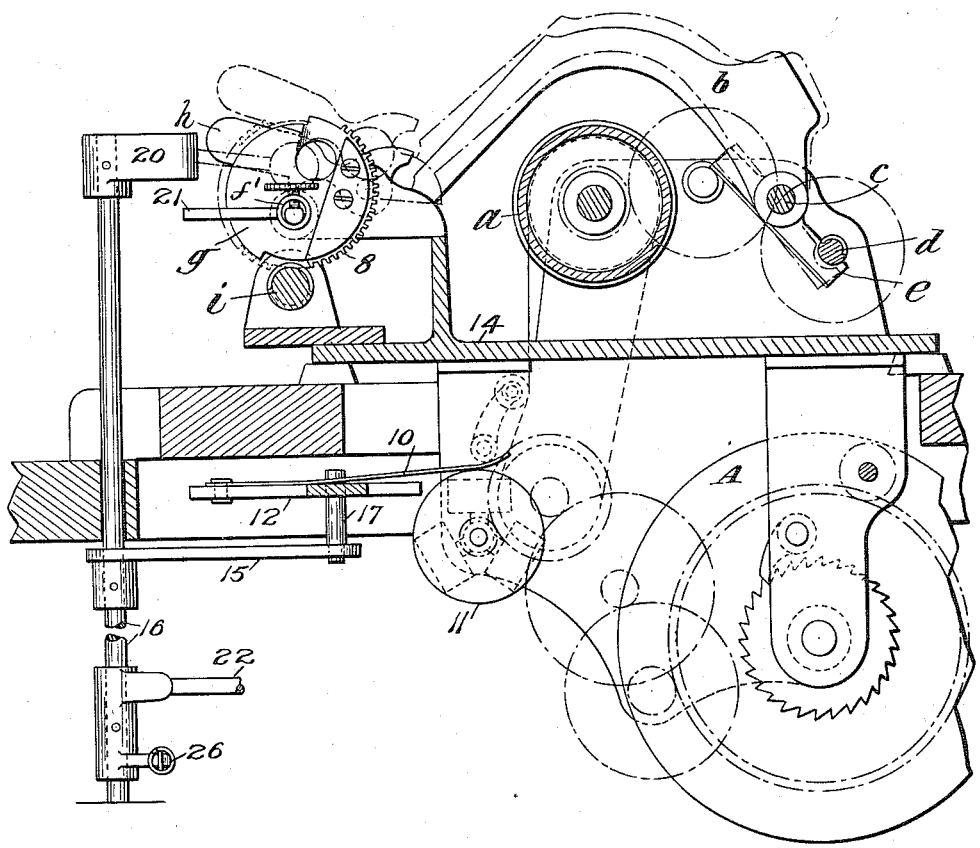
Figure 7:
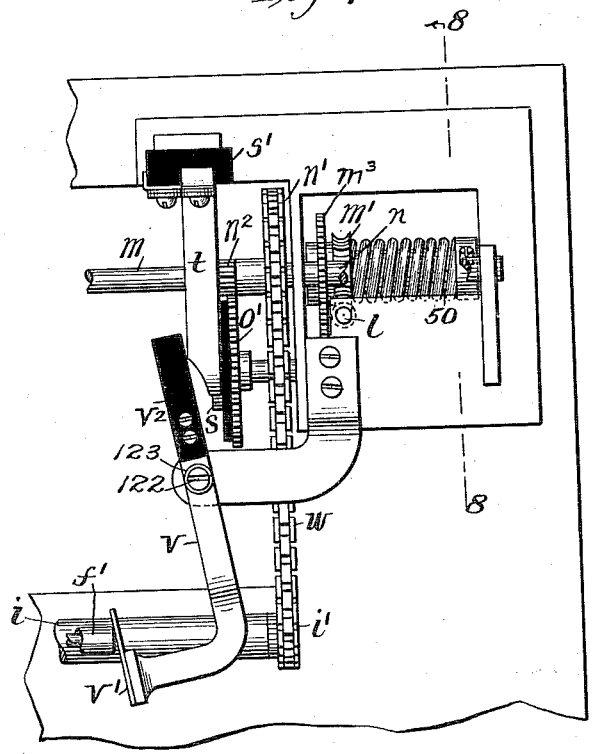
Figure 8:
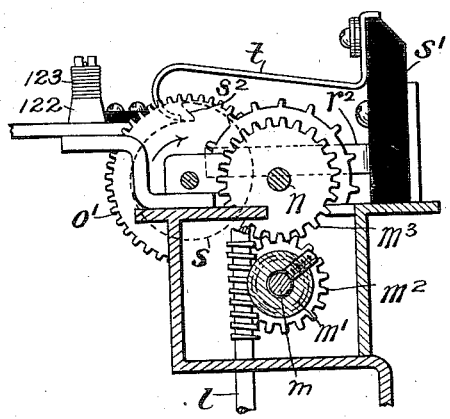

In said drawings:—Figure 1 is a front elevation of a phonograph provided with automatic rewinding, return and starting and stopping mechanisms in accordance with the present invention. Fig. 2 is a section on line 2 of Fig. 1. Fig. 3 is a plan view of the starting and stopping mechanism and check actuated mechanism for controlling the starting movement. Fig. 4 is a section taken on line 4 of Fig. 3. Fig. 5 is a partial plan view of parts shown in Fig. 2. Fig. 6 is a detail view which will be hereinafter referred to. Fig. 7 is a plan view of the mechanism shown at the right in Fig. 1. Fig. 8 is a section on line 8 of Fig. 7.

Referring to the drawings, $a$ represents the mandrel or record carrier, $b$ the reproducer arm mounted to slide on the rod $c$, $d$ the feed screw, and $e$ the feed nut of a phonograph of common construction. The mandrel $a$ and feed screw $d$ are driven by a spring motor A as usual in machines of the type shown, the motor thus forming part of the operating mechanism of the phonograph. The reproducer arm $b$ carries upon a forwardly extending portion thereof an eccentrically pivoted disk $g$ which co-acts with a return feed screw $i$ for raising the reproducer arm and returning the same to starting position, the disk being rotated by the engagement of teeth 8 on the disk with teeth on the return feed screw for raising the reproducer arm when the return feed screw is rotated and a return movement being then imparted to the disk and reproducer arm by means of the engagement of a part of the disk with the thread of the return screw. The eccentric disk $g$ is provided with a hub $g'$ having a notch with which a latch $h$ is adapted to engage, whereby after the disk has been turned into position to co-act with the thread of the return screw it will be held against further rotation during the return movement of the reproducer arm. As the reproducer reaches the end of its return movement this latch $h$ is tripped by engagement with an adjustable cam rod or arm 113, thereby releasing the cam disk and permitting it to be turned by the continued rotation of the return feed screw to bring its low portion opposite the screw and thereby lower the reproducer arm to bring the reproducer again into position to engage the record. The teeth on the return feed screw do not extend over the full length of the screw, the portion of the screw with which the disk engages when the reproducer has been returned to its starting position being circumferentially smooth. When the disk has been turned, therefore, to lower the reproducer arm, it will, during any further rotation of the return feed screw as well as during the next reproducing movement of the reproducer, rest with its lower portion opposite the return feed screw and with the shoulder formed by the first of its teeth 8 bearing against the return feed screw ready to be engaged by the teeth on the return feed screw when the latter is rotated for the next return movement, the disk being balanced or weighted so as to rest in this position. This automatic return mechanism is more fully shown and described in my application No. 219,599, before referred to, and for a fuller description thereof reference is made to such application.

The spring of the motor A is automatically rewound after each reproducing operation of the phonograph, and the return shaft $i$ driven, by means of an electric motor E which is shown as connected with the winding spindle of the spring motor and with the return shaft $i$ and controlled by a circuit opening and closing means as in my application No. 219,599 above referred to. The upwardly extending shaft $l$ of the electric motor is provided with a worm meshing with a worm wheel $m'$ loosely mounted on a shaft $m$ and connected therewith through a suitable friction or slip coupling 50. The shaft $m$ is connected with the winding shaft of the spring motor so as to effect the winding of the spring of the spring motor when the shaft $m$ is rotated, and the interposition of the friction coupling 50 between the worm wheel and the shaft $m$ permits of the electric motor operating for such length of time at each operation as to always insure a full rewinding of the spring motor, since the friction coupling permits the worm gear to be driven after the spring motor has been fully rewound, the resistance to the rotation of the shaft $m$ then being sufficient to cause the parts of the coupling to slip. A gear $m^2$ fast to the worm gear $m'$ meshes with a gear $m^3$ on a short shaft $n$, which shaft will thus be driven so long as the motor operates. The return feed screw $i$ is driven from this shaft $n$ by a sprocket chain $w$ running on a sprocket wheel $n'$ on the shaft $n$ and a sprocket wheel $i'$ on the feed screw shaft. The shaft $n$ also carries a pinion $n^2$ meshing with a gear $o'$ mounted to rotate with which is an insulated cam disk $s$ of conducting material having an undercut shoulder $s^2$ between the high and low portions of its cam periphery. A spring contact arm $r^2$ bears constantly against the face of the cam disk $s$, and a second spring contact arm $t$ is adapted to bear against the periphery of the cam disk, being, however, normally held out of engagement therewith by means of a rocking arm or lever $v$ when the cam disk is in the position of rest shown in Fig. 8, the rocking lever $v$ preferably carrying a block of insulating material $v^2$ for engagement with the end of the contact spring $t$. The contact springs $r^2$ and $t$ are suitably insulated, as by being mounted on a block $s'$ of insulating material, and are connected in the motor circuit so that when the contact spring $t$ is in engagement with the cam disk $s$ the motor circuit will be closed, and when the contact spring $t$ is held out of engagement with the cam disk $s$ the motor circuit will be open.

The rocking lever $v$ is pivoted at 122 and is under tension of a spring 123 which tends to swing the lever on its pivot to move the block $v^2$ toward and beneath the contact arm $t$. The other end of the rocking arm is provided with a foot piece $v'$ which lies in the path of movement of a sleeve $f'$ carried by the reproducer arm of the phonograph, the foot piece $v'$ when the rocking arm is in position with its insulating block beneath the end of the contact spring $t$ lying in position to be engaged by the sleeve $f'$ as the reproducer arm approaches the end of its reproducing movement. During the reproducing operation of the phonograph the rocking arm $v$ is in its normal position with its insulating block $v^2$ beneath the end of the contact spring $t$. As the reproducer arm approaches the end of its reproducing movement, the sleeve $f'$ comes into engagement with the foot piece $v'$ and forces the lever against the tension of its spring so as to move the insulating block $v^2$ from beneath the end of the contact spring $t$, as shown in Fig. 1, permitting the latter to engage the periphery of the cam disk $s$ as shown in Fig. 8. The circuit to the electric motor being thereby closed, the motor will start to operate and will continue to operate until the gear $o'$ and cam disk $s$ have made one rotation, at the end of which time the contact spring $t$ will drop from the end of the high part of the cam disk and again rest on the insulating block $v^2$, the lever $v$ having in the meantime been returned by its spring to its normal position.

The connections between the cam disk $s$ and the worm wheel $m'$ and between the return screw shaft and the worm wheel are such that the cam disk is not given a complete rotation until the worm wheel has been rotated more than sufficient to insure the rewinding of the spring motor and the return feed screw has been given a rotation more than sufficient to effect the raising of the reproducer arm and its complete return movement and to lower it again to its normal position.

The operation of the phonograph by the motor A is controlled by means of a stopping and starting device consisting preferably of a brake formed by a spring plate 10 acting on the periphery of a disk 11 on the governor shaft of the motor. The brake spring 10 is moved into and out of operative position in a direction tangential to the periphery of the disk 11, and for this purpose it is preferably and as shown carried by a reciprocating plate 12 shown as pivotally mounted on a stud 13 extending downward from the base plate 14 of the phonograph (see Fig. 6). When the plate 12 is swung in one direction, the brake spring will be carried into engagement with the periphery of the disk 11, as shown in Fig. 1 and in full lines in Fig. 2, thereby stopping the operation of the motor and of the phonograph. When the plate 12 is swung in the other direction, to retract the brake spring and release the disk, the brake spring will first move while in contact with the disk and thereby impart a starting movement thereto. Any chance of the motor and the mechanism driven thereby failing to start when released will thus be avoided. The plate or support 12 might be actuated by any suitable means for hand or automatic operation. As shown, it is oscillated by means of a spring 26 acting through a vertical shaft 16 and an arm 15 carried by said shaft, said arm having a pin 17 extending into a cam slot 18 in the plate 12. The shaft 16 is turned against the tension of the spring 26 for causing the brake spring 10 to move into operative position by the return movement of the reproducer arm, and the turning of the shaft in the opposite direction for retracting the brake spring is controlled by the check actuated mechanism. For this purpose, in the construction shown, the shaft 16 carries at its upper end a short arm 20 projecting into the return movement path of a finger 21 carried by the reproducer arm $b$. On the forward movement of the reproducer arm the finger 21 travels beneath the arm 20, but on the return movement of the reproducer arm when it is in its elevated position, as shown in dotted lines in Fig. 2, the finger 21 is raised so that the arm 20 extends into the path of its returning movement. The shaft 16 also carries a long latch arm 22 which extends through a slot in a guide bar 23 and the end of which arm 22 when the shaft 16 is rocked to the position shown in full lines in Fig. 2 under runs the end of a rocking beam 24 and comes into position to be engaged by a shoulder 25 on said beam as shown in Fig. 4, by which engagement of the arm 22 with the shoulder 25 the shaft 16 is held against turning under tension of the spring 26. The pressure of the end of the latch arm 22 against the shoulder 25 should not be so great as to interfere with the movement of the beam 24 under the influence of the check as hereinafter described; and in order that sufficient force may be exerted on the supporting plate 12 to effect a sufficiently forcible retraction of the brake without causing too great a pressure of the latch arm against the shoulder 25 in the construction shown, the latch arm is made considerably longer than the arm 15. The arm 15 and the latch arm thus form a lever which is engaged by the shoulder 25 at a point farther from its fulcrum than its connection with the plate 12. The other arm of the rocking beam 24 carries a coin tray or receptacle 27 in position beneath the lower end of a coin chute 28, and the beam is normally held in the position shown in Fig. 3 by means of an adjustable weight 29, such weight being sufficient to hold the beam normally in the position shown, but to be overbalanced by the coin or check delivered on the tray. When in this position the shoulder 25 is in position to engage the end of the latch arm 22 and hold the arm and the shaft 16 against movement by the spring 26. The beam 25 is shown as pivotally mounted in a support 30 extending upward from a base 31, and the end of the coin chute 28 is supported by a bracket 32 extending upward from the base plate 31, being clamped to said bracket by means of a strap 33.

When the phonograph is at rest the various parts are in the position shown by full lines in the drawings, the operating parts being held against operation by the brake spring 10 bearing on the disk 11 and the reproducer arm having been returned to position to begin the reproduction of a record and having been lowered to its reproducing position by rotation of the eccentric disk $g$. The parts being in these positions, if a coin be dropped through the chute 28 onto the coin tray 27 the beam will thereby be rocked to raise the shoulder 25, thereby releasing the latch arm 22 and permitting the vertical shaft 16 to rock under the tension of the spring 26. By the rocking of the shaft 16, the arm 15 will be thrown to the position shown by dotted lines in Fig. 2, thereby moving the plate 12 from the position shown in full lines to that shown in dotted lines in Fig. 2. By such movement of the arm 12, the brake spring 10 will be retracted, moving first tangentially to and in contact with the periphery of the disk 11 and thereby imparting a starting movement to the disk and then being moved entirely clear of the disk to permit the disk to rotate and the rest of the operating mechanism of the phonograph to operate under the influence of the motor spring, the mandrel $a$ rotating to rotate the record cylinder carried thereby and the feed screw $d$ rotating to feed the reproducer carrier longitudinally of the mandrel to carry the reproducer over the record. The reproducing operation of the phonograph will continue until, as the reproducer arm or carrier reaches the end of its reproducing movement, the lever $v$ is moved to carry the insulating block $v^2$ from beneath the end of the contact spring $t$, thereby closing the circuit to the electric motor E. The electric motor will then operate to rewind the spring motor and to rotate the return feed screw $i$, thereby causing the reproducer arm or carrier to be raised and returned to its normal or starting position, as hereinbefore explained. During the return movement of the reproducer carrier, the finger 21 will engage the arm 20 and move the same from the position shown in dotted lines to that shown in full lines in Fig. 2, thereby turning the shaft 16 against the tension of the spring 26 and returning the latch arm 22 to position to be engaged again by the shoulder 25 on the beam 24, in which position it will then be held by the shoulder 25, the coin having fallen from the inclined tray 27 and the position of the beam being again determined by the weight 29. By such rocking of the shaft 16, the arm 15 and thereby the plate 12 will be returned to the positions shown by full lines in Fig. 2, and by such return movement of the plate 12 the brake spring 10 will be carried again into contact with the periphery of the disk 11, thereby stopping the rotation of said disk and the operation of the motor A and parts driven thereby. The electric motor will then continue to operate until, when the cam disk $s$ has made a complete rotation, the spring contact $t$ drops from the end of the high point of the cam disk thereby opening the motor circuit and coming to rest on the insulating block $v^2$. The operation of the electric motor will then cease and the various operative parts of the entire machine will again be in their normal position of rest, the spring of the spring motor having been rewound in readiness for another operation.

It will be understood that the invention is not to be limited to the exact construction, arrangement and combinations of parts as shown in the drawings for the purpose of illustrating the invention and to which the foregoing description has been mainly confined, but that it includes various changes and modifications thereof within the claims.

Features of invention contained in the construction shown and not claimed herein are claimed in the original application of which this is a division and in my pending application No. 219,599 and in my Patent No. 859,114.

What I claim is:—

1. The combination with a spring motor, of a stop device for normally preventing operation of the spring motor, an electric motor for rewinding the spring motor, means for retracting said stop device to permit the spring motor to operate, means controlled by the movement of a part actuated by the spring motor for closing the circuit to the electric motor after a predetermined operation of the spring motor, adjustable means for determining the amount of operation of the spring motor after which the circuit to the electric motor shall be closed, and means for returning the stop device to operative position after the completion of the predetermined operation of the spring motor.

2. The combination with a spring motor, of a stop-device for normally preventing operation of the spring motor, a second motor for rewinding the spring motor, means for retracting the stop device to permit the spring motor to operate, means controlled by the movement of a part actuated by the spring motor for causing the spring motor to be rewound by the second motor after a predetermined operation of the spring motor, and means operated by the power of the second motor for returning said stop device to operative position.

3. The combination with a motor, of a stop device for normally preventing operation of said motor, a second motor for storing power in the first said motor, means for retracting the stop device to permit the first motor to operate, means controlled by the movement of a part actuated by the first motor for causing the second motor to operate to store power in the first motor, and means operated by the power of the second motor for causing said stop device to return to operative position.

4. The combination with a motor, of a stop device for normally preventing operation of said motor, a second motor for storing power in the first said motor, means for retracting the stop device to permit the first motor to operate, means controlled by the movement of a part actuated by the first motor for causing the second motor to operate after a predetermined operation of the first motor, adjustable means for determining the amount of operation of the first motor after which the second motor is caused to operate, means for returning the stop device to operative position after the first motor has made such predetermined operation, and means independent of the first motor for automatically stopping the second motor after a predetermined operation thereof.

5. The combination with a motor, of a stop device for normally preventing operation of said motor, an electric motor for storing power in the first said motor, means for retracting said stop device to permit the first motor to operate, a shouldered cam disk of conducting material turned by the electric motor, a spring contact arm adapted to bear against the cam portion of said disk, a contact device bearing against another portion of said disk, circuit connections with said contact arm and contact device for completing the circuit to the electric motor through said disk, a spring latch for entering beneath the contact arm when the latter has been raised by the cam disk, said latch being adapted to support the contact arm when the shoulder of the cam disk has moved beyond the contact arm, and means controlled by the movement of a part actuated by the first motor for moving said latch to release the contact arm.

In testimony whereof, I have hereunto set my hand, in the presence of two subscribing witnesses.

WILLIAM W. ROSENFIELD.

Witnesses:
A. L. KENT,
P. F. KEHOE.